US009826276B2

(12) United States Patent  
Guntur et al.

(10) Patent No.: US 9,826,276 B2
(45) Date of Patent: Nov. 21, 2017

(54) METHOD AND COMPUTING DEVICE FOR PERFORMING VIRTUAL CAMERA FUNCTIONS DURING PLAYBACK OF MEDIA CONTENT

(71) Applicant: Samsung Electronics Co., Ltd, Gyeonggi-do (KR)

(72) Inventors: Ravindra Guntur, Mysore (IN); Ravikiran Patil, Dharwad (IN); Mahesh Krishnananda Prabhu, Bangalore (IN)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/156,353

(22) Filed: Jan. 15, 2014

(65) Prior Publication Data

US 2014/0199043 A1   Jul. 17, 2014

(30) Foreign Application Priority Data

Jan. 15, 2013   (IN) .............................. 200/CHE/2013

(51) Int. Cl.
*H04N 5/76* (2006.01)
*H04N 21/4728* (2011.01)
*H04N 21/218* (2011.01)

(52) U.S. Cl.
CPC ... *H04N 21/4728* (2013.01); *H04N 21/21805* (2013.01)

(58) Field of Classification Search
None
See application file for complete search history.

(56) References Cited

U.S. PATENT DOCUMENTS

| | | | | |
|---|---|---|---|---|
| 2009/0245573 A1* | 10/2009 | Saptharishi | ........ | G06K 9/00771 382/103 |
| 2010/0070523 A1* | 3/2010 | Delgo | ................. | G06F 17/3079 707/769 |
| 2012/0050185 A1* | 3/2012 | Davydov | ............ | G06F 3/04883 345/173 |
| 2012/0182447 A1* | 7/2012 | Gabay | ................ | H04N 5/23222 348/231.6 |
| 2012/0308131 A1* | 12/2012 | Johnson | ................... | H04N 9/73 382/167 |
| 2013/0083999 A1* | 4/2013 | Bhardwaj | .......... | G06Q 30/0643 382/165 |
| 2013/0345967 A1* | 12/2013 | Pakzad | ................ | G01C 21/206 701/431 |

* cited by examiner

*Primary Examiner* — Eileen Adams

(57) ABSTRACT

A method and computing device are provided for performing virtual camera functions during playback of media content. In the method, the computing device selects a region of interest (RoI) during a playback of media content, and represents the RoI as an ensemble of disparate hypotheses. Then the computing device identifies the RoI in a frame sequence sampled according to the hypotheses, performs a virtual camera action on the identified RoI, and plays the RoI with a virtual camera.

20 Claims, 11 Drawing Sheets

METHOD AND COMPUTING DEVICE FOR PERFORMING VIRTUAL CAMERA FUNCTIONS DURING PLAYBACK OF MEDIA CONTENT

CROSS-REFERENCE TO RELATED APPLICATION(S) AND CLAIM OF PRIORITY

The present application is related to and claims the benefit under 35 U.S.C. §119(a) of an Indian patent application filed on Jan. 15, 2013 in the Indian Patent Office and assigned Serial No. 200/CHE/2013, the entire disclosure of which is hereby incorporated by reference.

TECHNICAL FIELD

The present disclosure relates to the field of multi-media systems and, more particularly, to a method and computing device for performing virtual camera functions during playback of media content on a computing device.

BACKGROUND

The ability of cameras to capture higher definition and larger format videos is becoming a commodity. On the other hand, display devices are small, constrained by network speeds and constrained by computational capabilities. Viewing high-definition or panoramic video on small screen devices results in scaling down of the display region. This results in loss in perceptual detail.

One of the major issues in video playback is the mismatch between the screen dimensions and the video frame dimensions. Today, it is very easy to record a High Definition (HD), Panoramic and Ultra High Definition (UHD) video. In many cases, these videos are viewed on small-screen devices. As a result, detail in the recorded video is lost. For example, viewing a high resolution lecture video on a small screen-device would result in the tiny characters from slides and whiteboard. Traditionally, this problem has been addressed by providing features such as pinch-to-zoom. These features are not adequate when the object of interest is rapidly moving. Too many user interactions are required in order to keep the object of interest in focus there by defeating the purpose of pleasant viewing experience.

SUMMARY

To address the above-discussed deficiencies, the present disclosure may provide a method and computing device for retargeting a viewport to screen dimensions by automatically zooming-in, zooming-out, and/or panning a selected region of interest (RoI) during the playback of video.

An embodiment in this disclosure may provide a method for performing a virtual camera function. The method comprises selecting a region of interest (RoI) during a playback of media content; representing the RoI as an ensemble of disparate hypotheses; identifying the RoI in a frame sequence sampled according to the hypotheses; performing a virtual camera action on the identified RoI; and playing the RoI with a virtual camera.

Another embodiment in this disclosure may provide a computing device for performing a virtual camera function. The computing device comprises a virtual camera control module configured to render media content, and a processor configured to select a region of interest (RoI) during a playback of media content, to represent the RoI as an ensemble of disparate hypotheses, to identify the RoI in a frame sequence sampled according to the hypotheses, to perform a virtual camera action on the identified RoI, and to play the RoI with a virtual camera.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
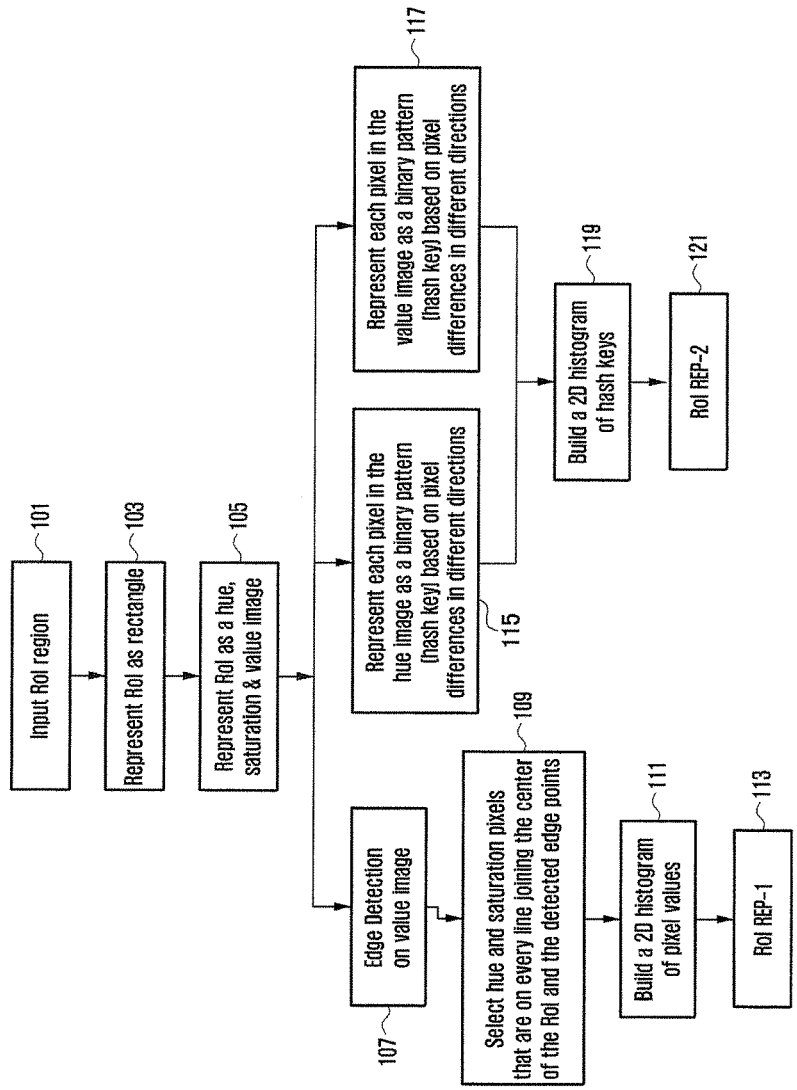
FIG. 1 illustrates a process of a method of representing a region of Interest (RoI) using two hypothesis in accordance with an embodiment of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged method and apparatus. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a frame" includes reference to one or more of such frames.

The present disclosure provides a method and computing device for performing virtual camera functions during playback of media content on a computing device (e.g., a mobile phone, smart phone, tablet, phablet, interactive television, and the like).

Video players have evolved in complexity in order to cater to the varying display resolutions, display sizes, availability of touch and gesture-based interactions. High resolution video is increasingly being viewed on small screen devices. Capture devices are also becoming miniaturized yet are able to capture high resolution videos. Sharing of captured videos is common. Nevertheless, there are key challenges in being able to quickly search, share and bookmark high resolution/large format videos on hand-held devices. Not all parts of a high resolution video are important for a user especially if one wants to share/save regions of interest, objects of interest, and/or view regions-of-interest.

In order to help users interact and have a better experience with large format (e.g., High Definition) videos on small screen devices, a video player that performs virtual camera functions in a pre-recorded video is disclosed. The virtual camera automatically zooms-in/zooms-out/pans of a region of interest within the high resolution video, there by retargeting a viewport to screen dimensions. Objects of interest appear magnified and in focus. As a result, the detail that was lost because of the small screen size is circumvented. The virtual camera automatically determines when to zoom-in/out, and how much to zoom-in/out. The present disclosure is also capable of capturing the user intent for the object of interest (OoI), retarget the OoI at 30 fps, and pre-fetching frames to initiate time delayed processing.

For example, during a video playback, a region-of-interest (RoI) is selected by a user via a touch based gesture by encircling a region of interest. For example, a RoI in a pre-recorded video is selected during video playback via spot-zoom, pinch zoom, or S-pen (stylus pen). The computing device can detect a gesture for selecting a RoI during the playback of video. Upon detection of such a gesture, a video playback may be slowed down/temporarily paused to aid selection of a RoI when an object of interest is moving.

Figure 6:
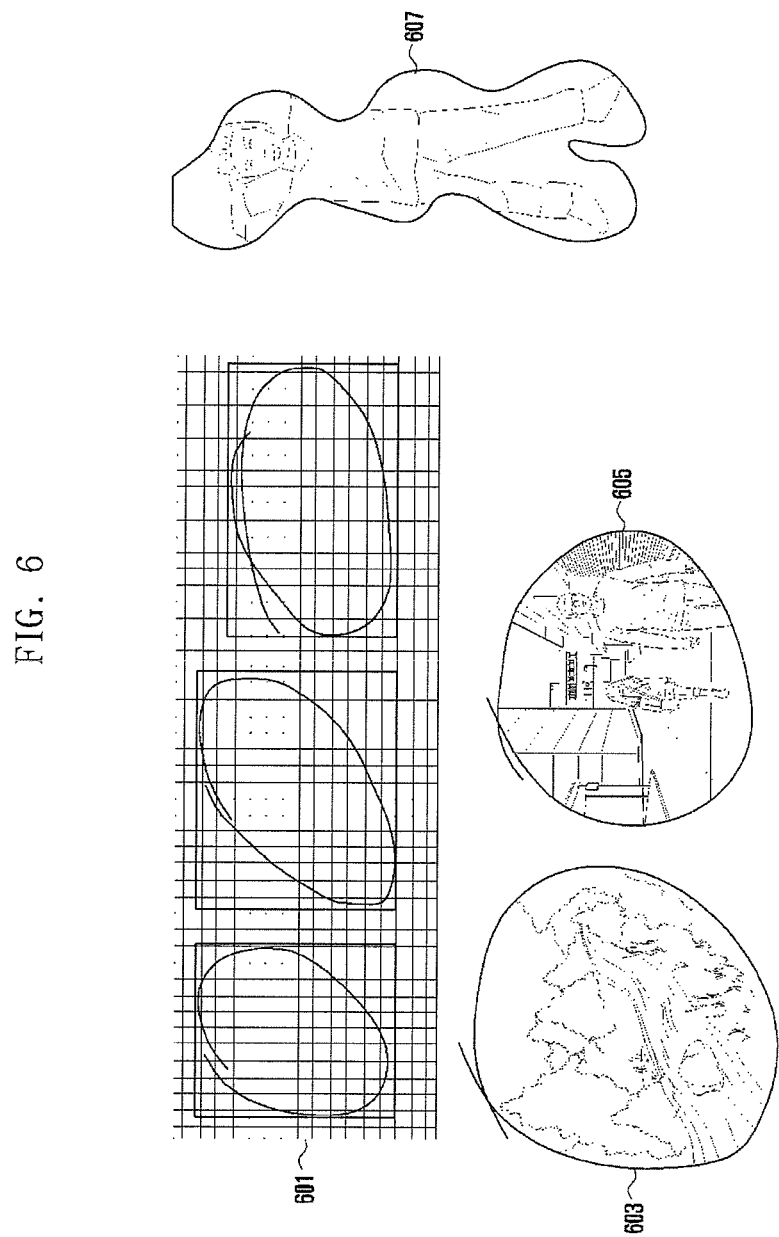
FIG. 6 illustrates a schematic view of a selection of a RoI in accordance with an embodiment of the present disclosure.

Exemplary RoIs selected by a user are shown in FIG. 6.

FIG. 6 illustrates a schematic view of a selection of a RoI in accordance with an embodiment of the present disclosure.

Referring to FIG. 6, when a user takes a touch gesture of drawing a circle as indicated by a reference number 601 during the playback of video, the RoI may be selected in a video playback screen through the touch gesture as indicated by reference numbers 603 and 605.

Alternatively, the RoI is automatically selected when the first time foreground motion is detected. In other embodiments, the RoI may be derived from an external source. The RoI can be of irregular size and shape as indicated by a reference number 607. The RoI may contain a specific object of interest (OoI). The OoI may move within a scene that has a fixed or a varying background or the OoI may be stationary in a scene. Sometimes, there may be many OoIs. The OoI may be a human, or a non-human entity or many such entities.

Upon selection of a RoI, the region is represented in a form over which computations can be performed as shown in FIG. 1.

FIG. 1 illustrates a process of a method of representing a region of Interest (RoI) using two hypothesis in accordance with an embodiment of the present disclosure.

Referring to FIG. 1, at operation 101, the computing device may detect an input of a RoI. Upon detection, the computing device may represent the RoI as a rectangle at operation 103. Although it is supposed that the RoI is represented as a rectangle, this is exemplary only and not to be considered as a limitation. Additionally, at operation 105, the computing device may represent the RoI as hue, saturation, and value images.

Then, at operation 107, the computing device may detect edges from a value image among the hue, saturation, and value images. Also, at operation 109, the computing device may select hue and saturation pixels that are on every line joining the center of the RoI and the detected edge points, and then at operation 111, build a 2D histogram of pixel values. And also, at operation 113, the computing device may refer to the 2D histogram of pixel values built at operation 111 as the first RoI representation (RoI REP-1).

Meanwhile, at operation 115, the computing device may represent each pixel in the hue image, among images represented at operation 105, as a binary pattern (hash key) based on pixel differences in different directions. Further, at operation 117, the computing device may represent each pixel in the value image as a binary pattern (hash key) based on pixel differences in different directions. Then, at operation 119, the computing device may build a 2D histogram of hash keys by using pixels in the hue and value images. Also, at operation 121, the computing device may refer to the 2D histogram of hash keys built at operation 119 as the second RoI representation (RoI REP-2).

In one exemplary implementation, the selected RoI is represented as an ensemble of disparate hypothesis.

Figure 2:
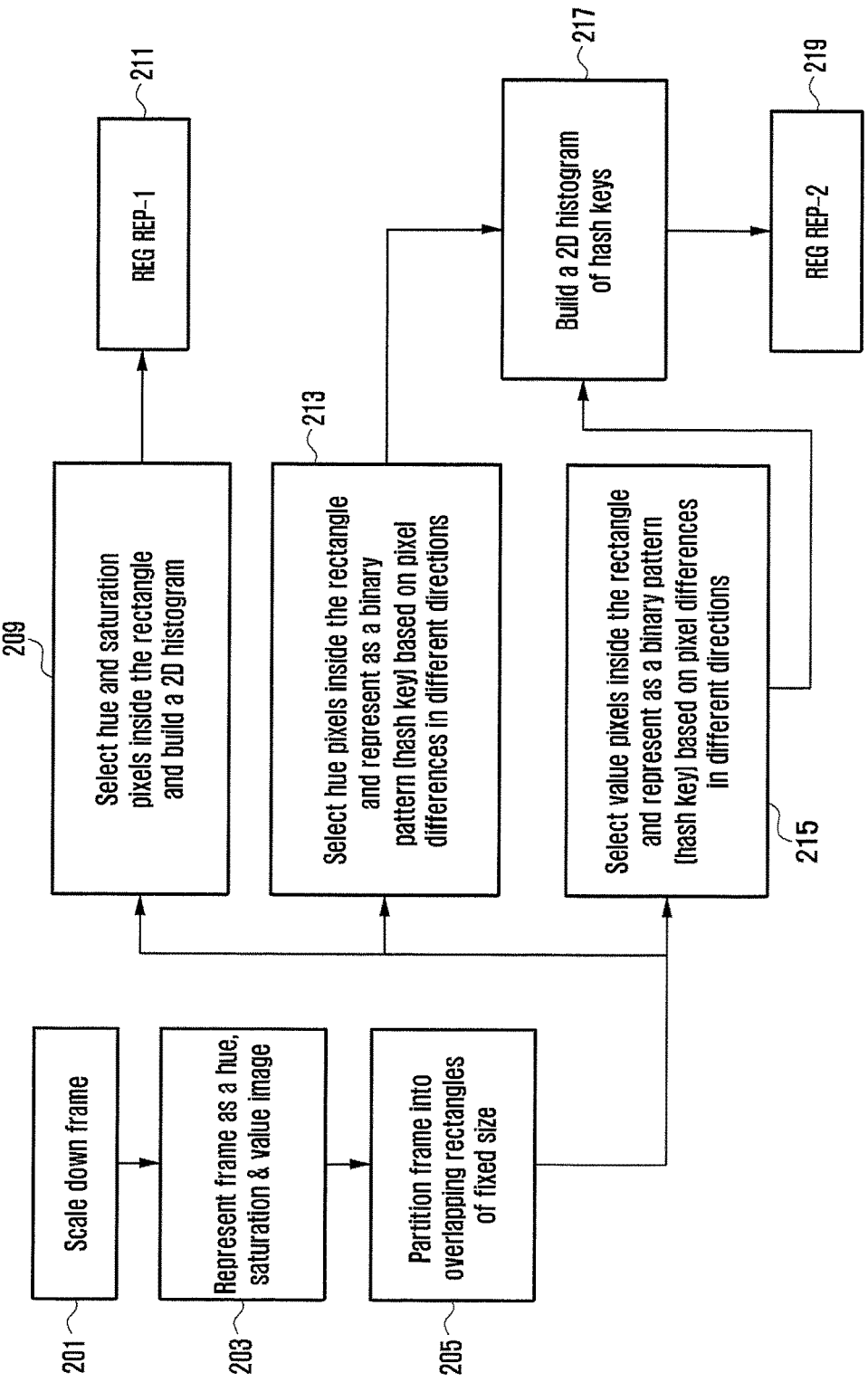
FIG. 2 illustrates a process of a method of converting each frame of a video in a computational form in accordance with an embodiment of the present disclosure.

FIG. 2 illustrates a process of a method of converting each frame of a video in a computational form in accordance with an embodiment of the present disclosure.

Referring to FIG. 2, while frames of the pre-recorded video are played out by a video player, the computing device may simultaneously sample and scale down the frames at periodic intervals at operation 201. Then, the computing device may represent the sampled and scaled-down frames as hue, saturation, and value images at operation 203, and decompose them into overlapping rectangles (i.e., the selected RoIs) at operation 205.

Additionally, each rectangle may be converted into a representation through operations 209 to 219 shown in FIG. 2. For example, each rectangle is represented as independent color and local pixel variation patterns derived from multiple image channels. Also, the rectangle is converted into a representation by selecting pixels from within the region of interest based on edge formation and centroid of the objects in the region of interest.

At at operation 209, the computing device may select hue and saturation inside the rectangle and build a 2D histogram using the hue and saturation pixel values. At operation 211, the computing device may represent the 2D histogram representation as the first rectangular representation (REG REP-1).

Additionally, for each rectangle at operation 207, the computing device may select hue pixels inside the rectangle and represent them as a binary representation based on pixel differences in different directions at operation 213. Also, at operation 215, the computing device may select value pixels inside the rectangle and represent them as a binary pattern (hash key) based on pixel differences in different directions. Further, at operation 217, the computing device may build a 2D histogram using hash keys representing hue pixels and value pixels. At operation 219, the computing device may represent the 2D histogram representation built using the hash keys as the second rectangular representation (REG REP-2).

Figure 7:
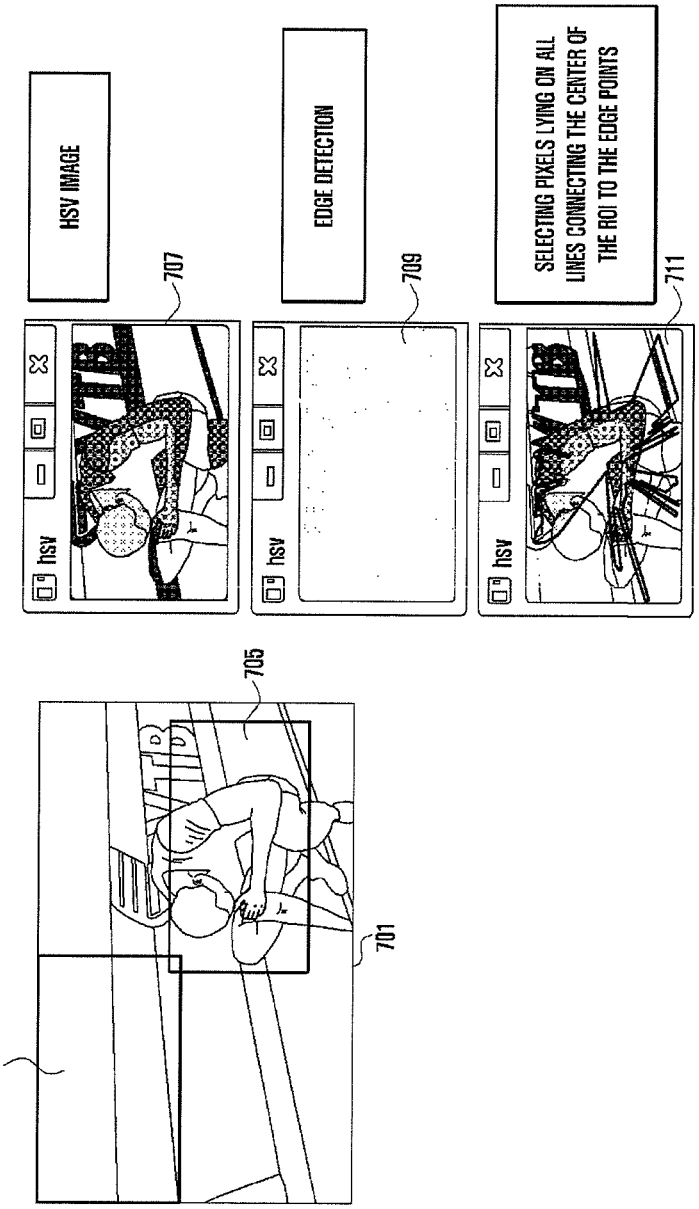
FIG. 7 illustrates a schematic view illustrating representation of the RoI in accordance with an embodiment of the present disclosure.

FIG. 7 illustrates a schematic view illustrating representation of the RoI in accordance with an embodiment of the present disclosure.

Referring to FIG. 7, an image 701 contains rectangular regions 703 and 705 which are selected RoIs. An image 707 represents the rectangular region 705 as a hue, saturation, and value image. An image 709 shows the edge regions computed from this hue map. An image 711 shows lines drawn from the center of the RoI to all the edge points. These lines are colored by the same values as in the image 701.

Figure 3:
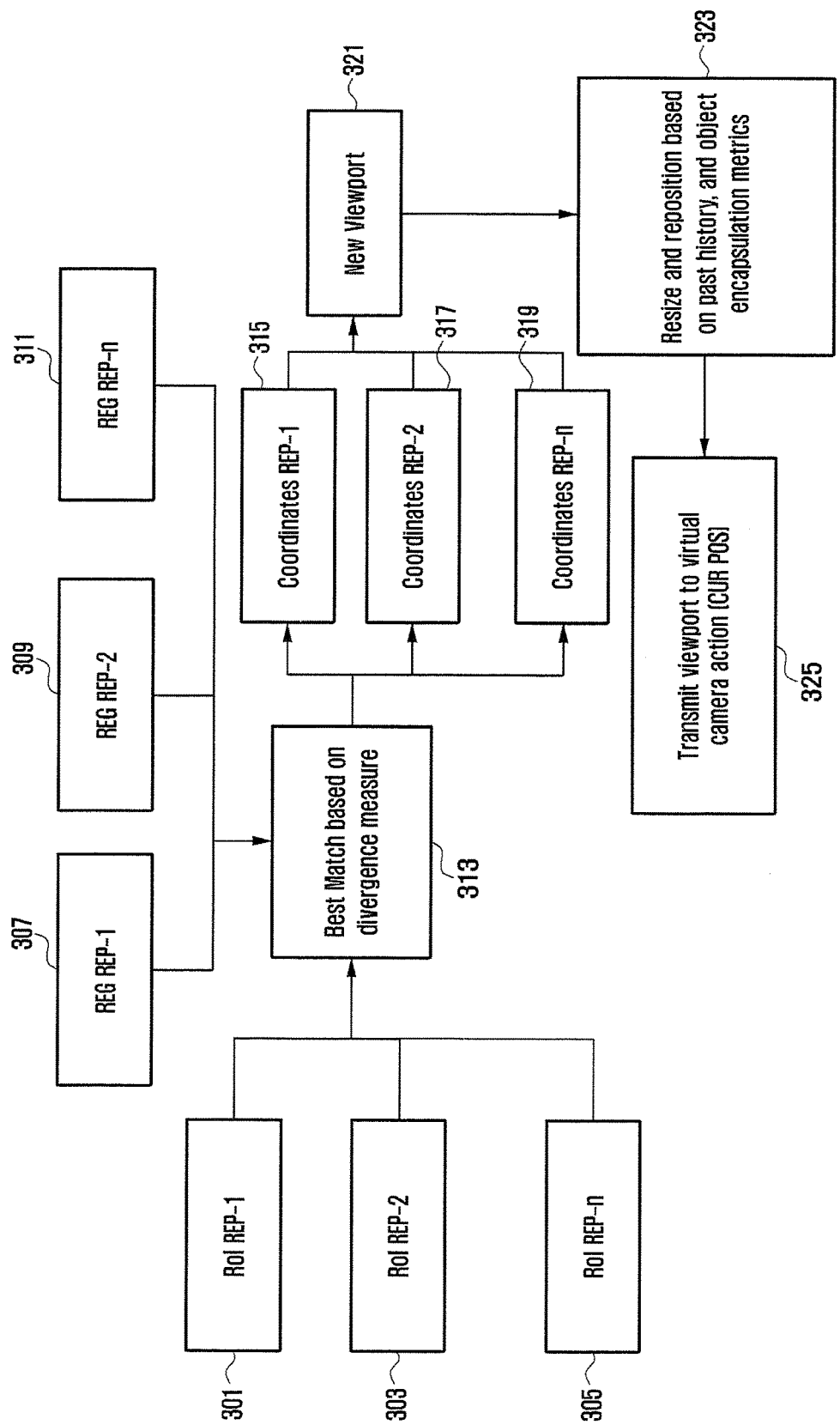
FIG. 3 illustrates a process of a method of determining new position of viewport which best matches an original RoI in accordance with an embodiment of the present disclosure.

FIG. 3 illustrates a process of a method of determining new position of viewport which best matches an original RoI in accordance with an embodiment of the present disclosure In the sampled frame, the rectangle which best matches the original RoI may be determined. As shown in FIG. 3, the rectangle which best matches the original RoI is determined based on a divergence measure that weighs different histogram bins and different cross bins comparisons differentially. The best matched rectangle determined by combining the verdicts from color based and local pixel variation based features may be used as the new position and size of the RoI.

Specifically, with regard to RoI REP-1 301, RoI REP-2 303, ..., RoI REP-n 305, REG REP-1 307, REG REP-2 309, ..., and REG REP-n 311, the computing device may perform at operation 313 a best match based on divergence measure through comparison between histogram bins and cross bins. Then the computing device may obtain coordinated REP-1 315, coordinated REP-2 317, ..., and coordinated REP-n 319, and determine them as new viewports at operation 321. Also, the computing device may resize and reposition, at operation 323, the viewports on the basis of past history and object encapsulation metrics, and then transmit such viewport to virtual camera action at operation 325.

Additionally, the new RoI may be repositioned accounting for object coverage metrics and heuristics for complete inclusion of object within the new RoI.

Hereinafter, the above-mentioned operation 325 will be described in detail with reference to FIG. 4.

Figure 4:
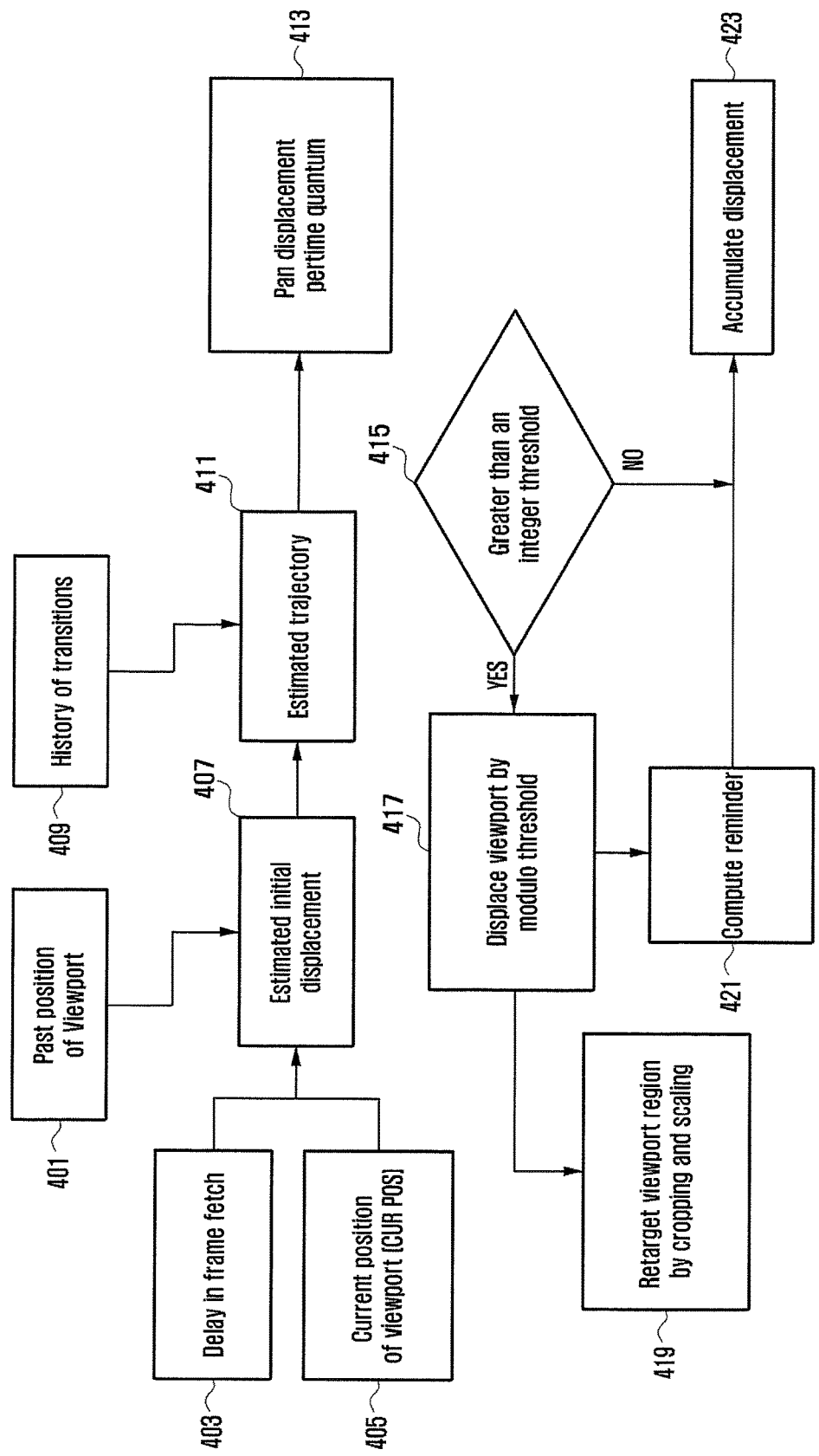
FIG. 4 illustrates a process of a method of performing virtual camera panning on the selected RoI in accordance with an embodiment of the present disclosure.

FIG. 4 illustrates a process of a method of performing virtual camera panning on the selected RoI in accordance with an embodiment of the present disclosure.

The camera functionality runs as a separate thread and performs virtual camera panning, zoom on the video being played out by the player. The smooth panning functionality (in frame sampled domain) is implemented using trajectory estimation techniques. This method accounts for the fact that the delay in processing the frame may happen between the point of capture of a frame and the point of request for a future frame.

Specifically, referring to FIG. 4, the computing device may estimate initial displacement at operation 407 through information about past position of viewport obtained at operation 401. Also, the computing device may estimate the initial displacement at operation 407 through both information about delay in frame fetch obtained at operation 403 and information about current position of viewport obtained at operation 405. Then, at operation 411, the computing device may estimate trajectory through both the initial displacement estimated at operation 407 and history of transitions obtained at operation 409. Through the estimated trajectory, the computing device may recognize panning displacement per time quantum at operation 413. Then, at operation 415, the computing device may determine whether the displacement is greater than a predefined threshold. If so, the computing device may displace viewport by modulo threshold at operation 417 and then retarget viewport region by cropping and scaling at operation 419. Also, the computing device may compute the remainder at operation 421 and then accumulate the displacement at operation 423.

Figure 5:
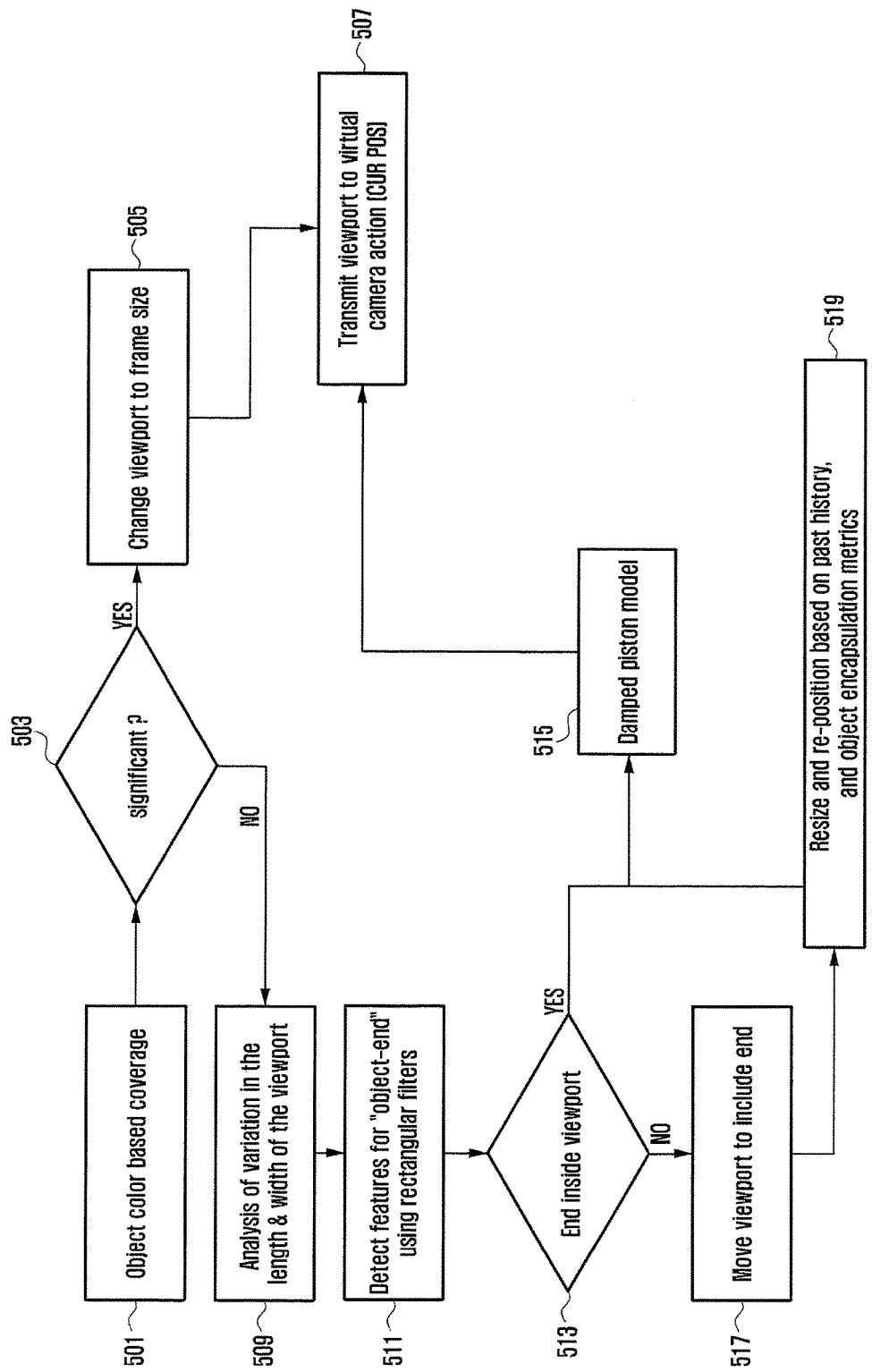
FIG. 5 illustrates a process of a method of performing virtual camera zoom-in and zoom-out on the selected RoI in accordance with an embodiment of the present disclosure.

The smooth camera zoom is implemented as described using method steps illustrated in FIG. 5.

FIG. 5 illustrates a process of a method of performing virtual camera zoom-in and zoom-out on the selected RoI in accordance with an embodiment of the present disclosure.

Referring to FIG. 5, the computing device may detect object color at operation 501. At operation 503, the computing device may determine whether the detected color is significant. If so, the computing device may change viewport to frame size at operation 505 and transmit the viewport to virtual camera action at operation 507. If the detected color is not significant, the computing device may search a variation in the length and width of the viewport at operation 509 and detect features for object-end using rectangular filters at operation 511. Additionally, the computing device may determine at operation 513 whether the end is inside the viewport. If so, the computing device may apply a damped piston model at operation 515 and transmit the viewport to virtual camera action at operation 507. If the end is not inside the viewport at operation 513, the computing device may move the viewport to include the end at operation 517, apply a damped piston model, and transmit the viewport to virtual camera action.

Figure 8:
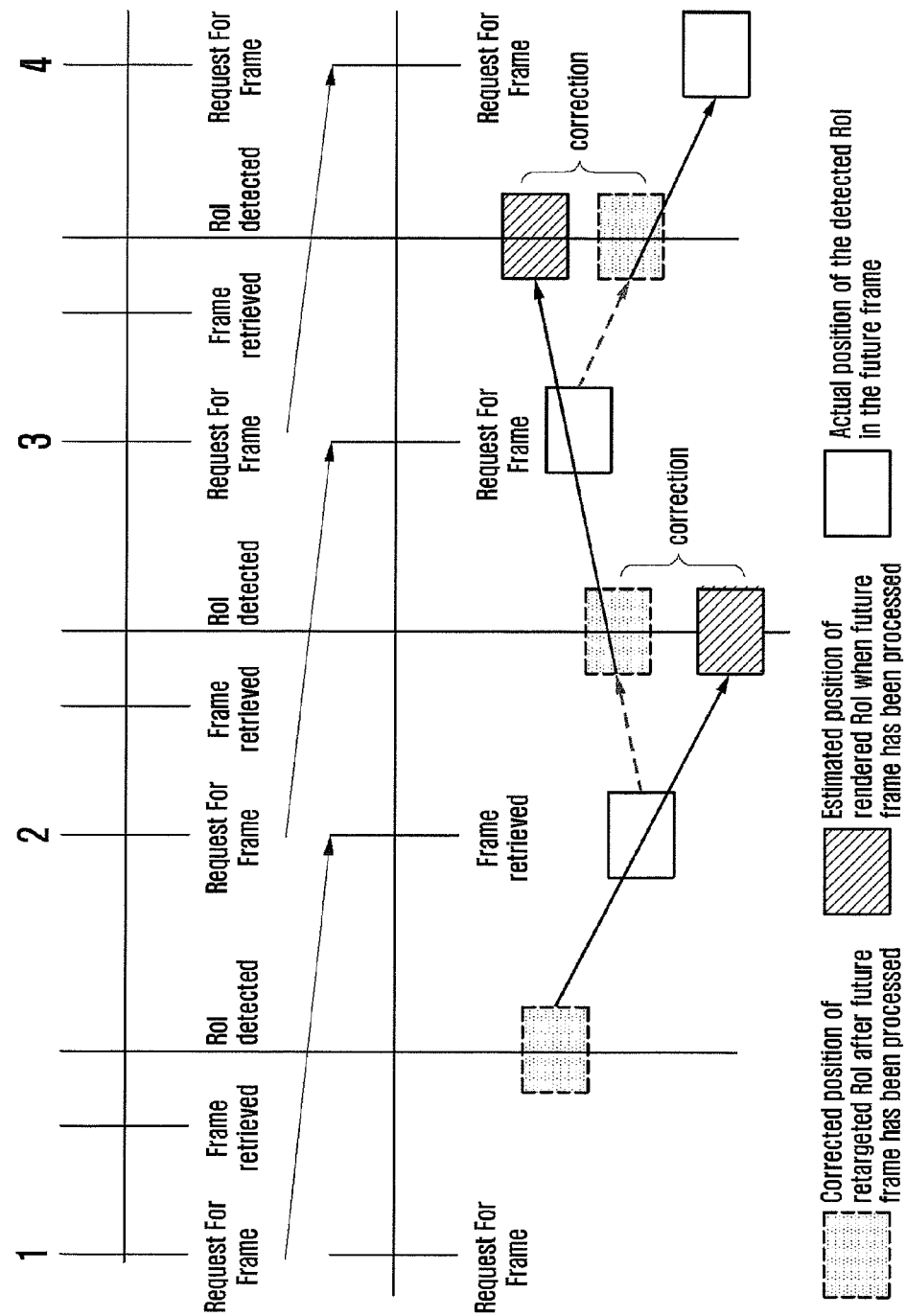
FIG. 8 illustrates how frame sampling is done and how the RoI trajectory estimates are adjusted at each sample instance in accordance with an embodiment of the present disclosure.

FIG. 8 illustrates how frame sampling is done and how the RoI trajectory estimates are adjusted at each sample instance in accordance with an embodiment of the present disclosure.

It can be noted that, the entire process of selection of RoI, and virtual camera control on the RoI can be performed multiple times simultaneously on different RoIs. In case multiple regions-of-interest are selected, the multiple ROIs are displayed in split-screen or picture-in-picture or thumbnail view. For example, the screen is split into multiple portions based on number of RoIs. In one embodiment, based on the initial RoI selection size, different RoIs may be assigned different ratios of screen ownership. Alternatively, different RoIs may be assigned equal share of screen ownership.

Figure 9A:
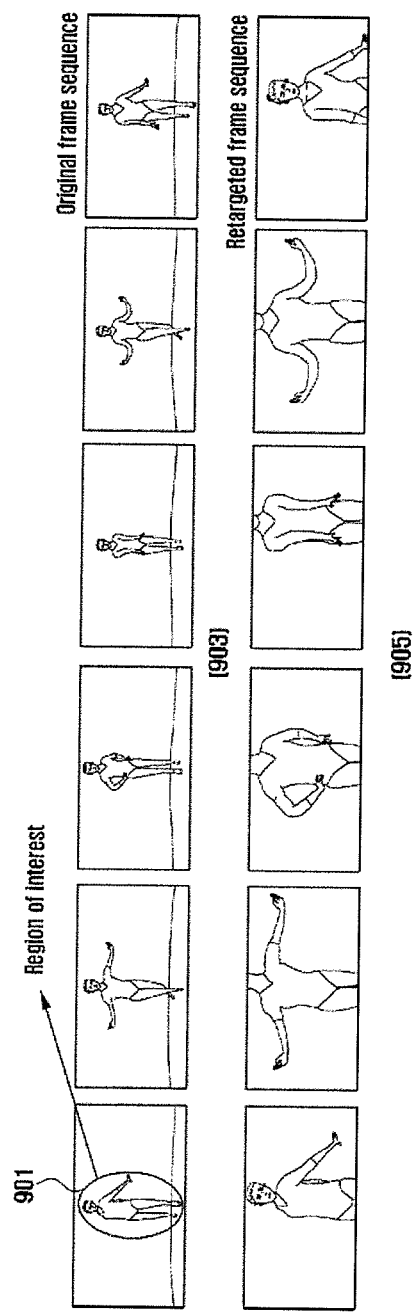
FIGS. 9A and 9B illustrate trajectory estimation of the selected RoI in accordance with embodiments of the present disclosure.
Figure 9B:
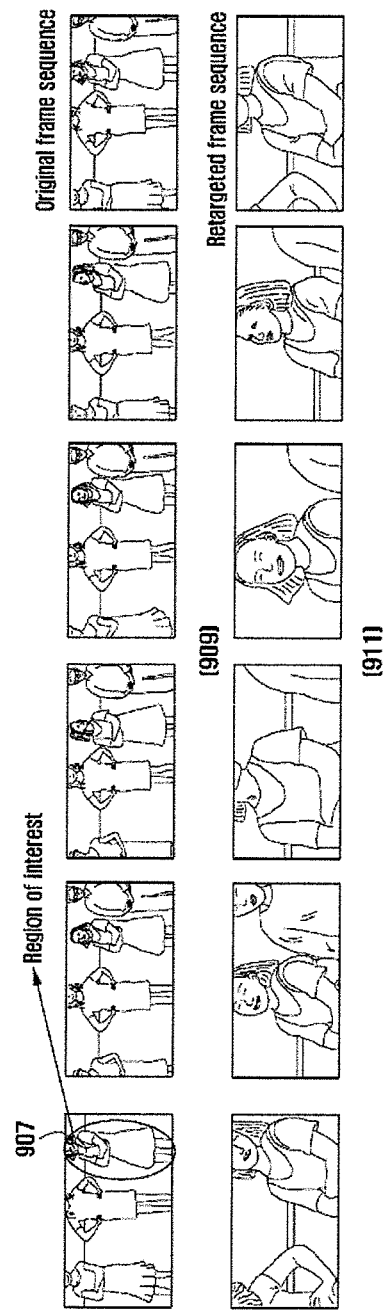

FIGS. 9A and 9B illustrate trajectory estimation of the selected RoI in accordance with embodiments of the present disclosure.

A reference number 901 in FIG. 9A indicates a RoI selected by a user during the playback of media content. A reference number 903 indicates an original frame sequence, and a reference number 905 indicates a retargeted frame sequence. The selected RoI 901 in the original frame sequence 903 may be played in an enlarged form as shown in retargeted frame sequence 905. Further, the viewport may be continuously adjusted through the detection of motion in the original frame sequence 903.

Similarly, a reference number 907 in FIG. 9B indicates a RoI selected by a user during the playback of media content. A reference number 909 indicates an original frame sequence, and a reference number 911 indicates a retargeted frame sequence. The selected RoI 907 in the original frame sequence 909 may be played in an enlarged form as shown in retargeted frame sequence 911. Further, the viewport may be continuously adjusted through the detection of motion in the original frame sequence 909.

Figure 10:
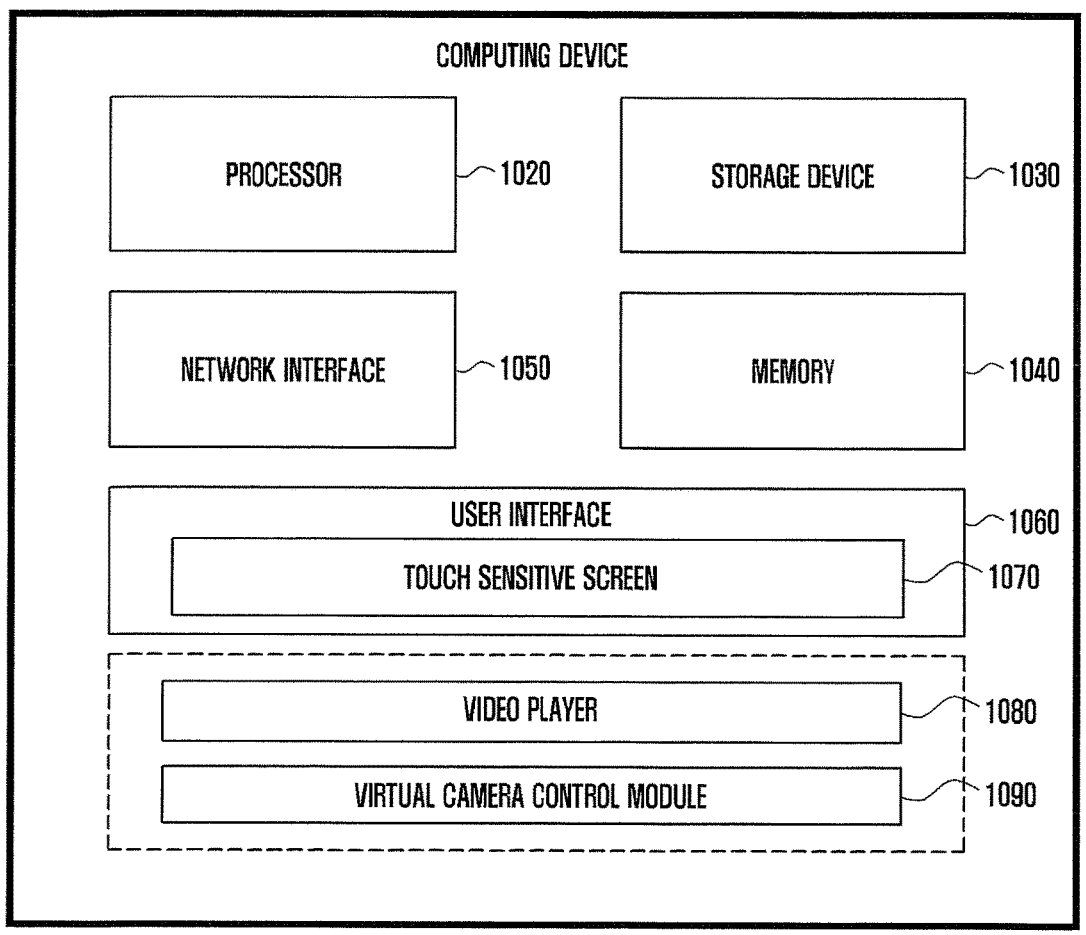
FIG. 10 illustrates a diagram of a computing device in accordance with an embodiment of the present disclosure.

FIG. 10 illustrates a diagram of a computing device in accordance with an embodiment of the present disclosure. Referring to FIG. 10, the computing device includes one or more processors 1020, a storage device 1030, a memory 1040, a network interface 1050, and a user interface 1060. In addition, the computing device includes a video player 1080 and a virtual camera control module 1090.

The computing device may include additional components not shown in FIG. 10 for purposes of clarity. For example, the computing device may also include a microphone and speaker, in examples where the computing device is capable of making telephone calls. The computing device may also include a battery that provides power to the components of computing device. The computing device may also include other user interface components, such as a keypad, trackball, mouse, or other such user interfaces that allow the user to interact with the computing device. Moreover, the components of the computing device shown in FIG. 10 may not be necessary in every example of the computing device.

The processor 1020 may be configured to implement functionality and/or process instructions for execution within the computing device. The processor 1020 may be capable of processing instructions stored in the memory 1040 or instructions stored on the storage device 1030. The processor 1020 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to the processor 1020, in this disclosure, may be embodied as software, firmware, hardware or any combination thereof.

The storage device 1030 may include one or more computer-readable storage media. Also, the storage device 1030 may include non-volatile storage elements. Examples of such non-volatile storage elements may include magnetic hard discs, optical discs, floppy discs, flash memories, or forms of electrically programmable memories (EPROM) or electrically erasable and programmable memories (EEPROM). In addition, the storage device 1030 may, in some examples, be considered a non-transitory storage medium. The term "non-transitory" may indicate that the storage medium is not embodied in a carrier wave or a propagated signal. However, the term "non-transitory" should not be interpreted to mean that the storage device is non-movable. In some examples, the storage device 1030 may be configured to store larger amounts of information than the memory 1040. In certain examples, a non-transitory storage medium may store data that can, over time, change (e.g., in RAM or cache).

The memory 1040 may be configured to store information within the computing device during operation. The memory 1040 may, in some examples, be described as a computer-readable storage medium. The memory 1040 may be described as a volatile memory, meaning that the memory does not maintain stored contents when the computer is turned off. Examples of volatile memories include random access memories (RAM), dynamic random access memories (DRAM), static random access memories (SRAM), and other forms of volatile memories known in the art. In some examples, the memory 1040 may be used to store program instructions for execution by processor 1020.

The computing device may utilize the network interface 1050 to communicate with external devices via one or more networks, such as one or more wireless networks. The network interface 1050 may be a network interface card, such as an Ethernet card, an optical transceiver, a radio frequency transceiver, or any other type of device that can send and receive information. Examples of such network interfaces 1050 may include Bluetooth®, 3G and WiFi® radios in mobile computing devices as well as USB. Examples of such wireless networks may include WiFi®, Bluetooth®, and 3G. In some examples, the computing device may utilize the network interface 1050 to wirelessly communicate with an external device (not shown) such as a server, mobile phone, or other networked computing device.

The user interface ("UI") 1060 allows a user of the computing device to interact with computing device. The UI 1060 may generate a graphical user interface ("GUI") that allows a user to initiate commands. For example, according to some aspects of the disclosure, the UI 1060 generates a GUI that is displayed on a touch sensitive screen ("touch screen") 1070. The GUI may include one or more touch sensitive UI elements. For example, a user may be able to interact with the computing device and initiate a command by touching one or more of the touch sensitive UI elements displayed on touch sensitive screen 1070.

The touch sensitive screen 1070 may include a variety of display devices such as a liquid crystal display (LCD), an e-ink display, a cathode ray tube (CRT), a plasma display, an organic light emitting diode (OLED) display, or another type of display device.

According to some aspects of the disclosure, the video player 1080 may play a pre-recorded video on the user interface 1060 of the computing device. The virtual camera control module 1090 may be configured for performing one or more method steps illustrated in FIGS. 1 to 5. For example, the virtual camera control module 1090 may automatically zoom-in/zoom-out/pans within the high resolution video, thereby retargeting a viewport to screen dimensions such that objects of interest appear magnified and in focus.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for playing a video on a screen of a computing device, the method comprising:
   detecting a gesture on the screen of the computing device for setting a region comprising at least one object included in the video that is playing on the screen of the computing device;
   identifying a plurality of frame sequences sampled from the video in response to the detected gesture, wherein the plurality of frame sequences comprises the at least one object;
   enlarging the at least one object in response to detecting a motion of the at least one object included in the region; and
   playing the video comprising the plurality of frame sequences that includes the enlarged at least one object on the screen of the computing device.

2. The method of claim 1, wherein the motion of the at least one object is detected within the plurality of frame sequences including at least one of a fixed background or a varying background.

3. The method of claim 1, wherein detecting the gesture further comprises:
   slowly playing the video when the gesture is detected; and
   temporarily pausing playing the video when the motion of the at least one object included in the region is detected within the plurality of frame sequences included in the video, wherein the region is set by at least one of a spot-zooming, a pinch zooming, or a stylus pen.

4. The method of claim 1, further comprising:
   representing, when the region is set in response to the detected gesture, the set region as an ensemble of disparate hypotheses;
   representing the set region as independent color and local pixel variation patterns derived from multiple image channels; and
   representing the region as the ensemble of disparate hypotheses by creating a representation of the region by selecting pixels from the region.

5. The method of claim 4, wherein identifying the at least one object comprises:
   identifying the region in the plurality of frame sequences sampled from the video according to the disparate hypotheses;
   determining a matched region by combining the disparate hypotheses in the plurality of frame sequences;
   setting the determined matched region as a viewport; and
   determining a position and size of the viewport, wherein the region is determined based on a divergence measurement that weighs different histogram bins and different cross bins comparisons differentially.

6. The method of claim 1, wherein playing the video comprises:
   estimating a moving trajectory of the at least one object when the motion of the at least one object is detected; and
   playing the video based on the estimated moving trajectory of the at least one object, wherein estimating the moving trajectory of the at least one object comprises:
   determining a position and size of a new viewport according to both information associated with a position and size of a past viewport and information associated with a position and size of a current viewport;
   displaying the new viewport; and
   resizing and repositioning the new viewport by the estimated moving trajectory when the motion of the at least one object included in the new viewport is detected.

7. The method of claim 6, wherein resizing and repositioning includes at least one of a zooming-in, a zooming-out, or a panning.

8. The method of claim 1, wherein the plurality of frame sequences is displayed on at least one of a split-screen, a picture-in-picture, or a thumbnail view.

9. A computing device for playing a video on a screen of the computing device, the computing device comprising:
   a virtual camera controller configured to render the video; and
   a processor operably connected to the virtual camera controller, the processor is configured to:
   detect a gesture on the screen of the computing device for setting a region comprising at least one object included in the video that is playing on the screen of the computing device;
   identify a plurality of frame sequences sampled from the video in response to the detected gesture, wherein the plurality of frame sequences comprises the at least one object;
   enlarge the at least one object in response to detecting a motion of the at least one object included in the region; and
   play the video comprising the plurality of frame sequences that includes the enlarged at least one object on the screen of the computing device.

10. The computing device of claim 9, wherein the processor is further configured to:
    slowly play the video when the gesture is detected; and
    temporarily pause playing the video when the motion of the at least one object included in the region is detected within the plurality of frame sequences included in the video, wherein the region is set by at least one of a spot-zooming, a pinch-zooming, or a stylus pen.

11. The computing device of claim 9, wherein the processor is further configured to:
    represent, when the region is set in response to the detected gesture, the set region as an ensemble of disparate hypotheses;
    represent the set region as independent color and local pixel variation patterns derived from multiple image channels; and
    represent the region as the ensemble of disparate hypotheses by creating a representation of the region by selecting pixels from the region.

12. The computing device of claim 11, wherein the processor is further configured to:
    identify the region in the plurality of frame sequences sampled from the video according to the disparate hypotheses;
    determine a matched region by combining the disparate hypotheses in the plurality of frame sequences;
    set the determined matched region as a viewport; and
    determine a position and size of the viewport, wherein the region is determined based on a divergence measurement that weighs different histogram bins and different cross bins comparisons differentially.

13. The computing device of claim 9, wherein the processor is further configured to:
    estimate a moving trajectory of the at least one object when the motion of the at least one object is detected; and
    play the video based on the estimated moving trajectory of the at least one object, wherein the estimation of the moving trajectory of the at least one object comprises:
    determine a position and size of a new viewport according to both information associated with a position and size of a past viewport and information associated with a position and size of a current viewport;
display the new viewport; and
resize and reposition the new viewport by the estimated moving trajectory when the motion of the at least one object included in the new viewport is detected.

14. The computing device of claim 9, wherein the virtual camera controller is further configured to determine at least one of zoom-in, zoom-out, or pan the set region.

15. A non-transitory computer readable medium comprising a program code, that when executed by a processor, cause the processor to:
 detect a gesture on a screen of a computing device for setting a region comprising at least one object included in a video that is playing on the screen of the computing device;
 identify a plurality of frame sequences sampled from the video in response to the detected gesture, wherein the plurality of frame sequences comprises the at least one object;
 enlarge the at least one object in response to detecting a motion of the at least one object included in the region; and
 play the video comprising the plurality of frame sequences that includes the enlarged at least one object on the screen of the computing device.

16. The non-transitory computer readable medium of claim 15, further comprising the program code, that when executed by the processor, cause the processor to:
 slowly play the video when the gesture is detected; and
 temporarily pause playing the video when the motion of the at least one object included in the region is detected within the plurality of frame sequences included in the video, wherein the region is set by at least one of a spot-zooming, a pinch-zooming, or a stylus pen.

17. The non-transitory computer readable medium of claim 15, further comprising the program code, that when executed by the processor, cause the processor to:
 represent, when the region is set in response to the detected gesture, the set region as an ensemble of disparate hypotheses;
 represent the set region as independent color and local pixel variation patterns derived from multiple image channels; and
 represent the region as the ensemble of disparate hypotheses by creating a representation of the region by selecting pixels from the region.

18. The non-transitory computer readable medium of claim 17, further comprising the program code, that when executed by the processor, cause the processor to:
 identify the region in the plurality of frame sequences sampled from the video according to the disparate hypotheses;
 determine a matched region by combining the disparate hypotheses in the plurality of frame sequences;
 set the determined matched region as a viewport; and
 determine a position and size of the viewport, wherein the region is determined based on a divergence measurement that weighs different histogram bins and different cross bins comparisons differentially.

19. The non-transitory computer readable medium of claim 15, further comprising the program code, that when executed by the processor, cause the processor to:
 estimate a moving trajectory of the at least one object when the motion of the at least one object is detected;
 play the video based on the estimated moving trajectory of the at least one object, wherein the estimation of the moving trajectory of the at least one object comprises:
  determine a position and size of a new viewport according to both information associated with a position and size of a past viewport and information associated with a position and size of a current viewport;
  display the new viewport; and
  resize and reposition the new viewport by the estimated moving trajectory when the motion of the at least one object included in the new viewport is detected.

20. The non-transitory computer readable medium of claim 15, further comprising the program code, that when executed by the processor, cause the processor to determine at least one of zoom-in, zoom-out, or pan the set region.

* * * * *